(12) United States Patent
Zhang

(10) Patent No.: US 11,595,797 B2
(45) Date of Patent: Feb. 28, 2023

(54) COMMUNICATION METHOD AND NETWORK DEVICE

(71) Applicant: TENCENT TECHNOLOGY (SHENZHEN) COMPANY LIMITED, Shenzhen (CN)

(72) Inventor: Yunfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/204,301

(22) Filed: Mar. 17, 2021

(65) Prior Publication Data

US 2021/0204104 A1 Jul. 1, 2021

Related U.S. Application Data

(63) Continuation of application No. PCT/CN2019/122414, filed on Dec. 2, 2019.

(30) Foreign Application Priority Data

Dec. 26, 2018 (CN) .......................... 201811603214.2

(51) Int. Cl.
*H04W 4/50* (2018.01)
*H04W 76/10* (2018.01)
*H04W 8/08* (2009.01)
*H04W 8/18* (2009.01)
*H04W 60/00* (2009.01)

(52) U.S. Cl.
CPC .............. *H04W 4/50* (2018.02); *H04W 8/08* (2013.01); *H04W 8/183* (2013.01); *H04W 60/00* (2013.01); *H04W 76/10* (2018.02)

(58) Field of Classification Search
CPC ....... H04W 4/021; H04W 8/183; H04W 8/08; H04W 60/00; H04W 4/50; H04W 76/10; (Continued)

(56) References Cited

U.S. PATENT DOCUMENTS 10,499,240 B2 * 12/2019 Shi .......................... H04L 12/14
10,812,977 B2 * 10/2020 Li ......................... H04W 72/1257
(Continued)

FOREIGN PATENT DOCUMENTS

CN 106102106 A 11/2016
CN 107079353 A 8/2017
(Continued)

OTHER PUBLICATIONS

The World Intellectual Property Organization (WIPO) International Search Report for PCT/CN2019/122414 dated Mar. 4, 2020 5 Pages (including translation).

(Continued)

*Primary Examiner* — Khawar Iqbal
(74) *Attorney, Agent, or Firm* — Anova Law Group, PLLC

(57) ABSTRACT

A communication method is provided for performance by a first network function entity. The communication method includes determining a service zone ID, transmitting information including the service zone ID to a second network function entity, where the service zone ID is used for the second network function entity to select a service producer instance from a service producer.

17 Claims, 10 Drawing Sheets

(58) Field of Classification Search
CPC ....... H04W 76/12; H04W 88/14; H04W 8/06; H04L 67/18; H04L 67/16; H04L 67/51; H04L 67/52
See application file for complete search history.

(56) References Cited

U.S. PATENT DOCUMENTS

| | | | | |
|---|---|---|---|---|
| 11,134,489 | B2* | 9/2021 | Mildh | H04W 72/0453 |
| 11,258,667 | B2* | 2/2022 | Yang | H04W 24/04 |
| 11,350,482 | B2* | 5/2022 | Kim | H04W 76/38 |
| 2005/0272443 | A1* | 12/2005 | Hose | H04W 4/021 |
| | | | | 455/456.1 |
| 2019/0253873 | A1 | 8/2019 | Shi et al. | |
| 2020/0045753 | A1* | 2/2020 | Dao | H04W 76/10 |
| 2020/0077327 | A1* | 3/2020 | Duan | H04W 76/11 |
| 2020/0154350 | A1* | 5/2020 | Dao | H04W 8/08 |
| 2021/0051444 | A1* | 2/2021 | Ryu | H04W 4/029 |
| 2021/0204104 | A1* | 7/2021 | Zhang | H04W 76/10 |
| 2021/0345438 | A1* | 11/2021 | Dao | H04W 72/042 |
| 2022/0124870 | A1* | 4/2022 | Bharatia | H04W 76/11 |

FOREIGN PATENT DOCUMENTS

| | | |
|---|---|---|
| CN | 108012260 A | 5/2018 |
| CN | 109548178 A | 3/2019 |
| WO | 2018089615 A1 | 5/2018 |

OTHER PUBLICATIONS

3GPP, "3GPP Technical Specification Group Services and System Aspects: Study on Enhancements to the Service-Based Architecture (Release 16)", 3GPP TR 23.742 V16.0.0, Dec. 19, 2018 (Dec. 19, 2018), pp. 118-121. 134 pages.

Chao Liu et al., "Research on 5G Service-Based Architecture (SBA)," Information and Communications Technology and Policy, Nov. 30, 2018 (Nov. 30, 2018). 6 pages.

The State Intellectual Property Office of the People's Republic of China (SIPO) Office Action 1 for for 201811603214.2 dated Mar. 3, 2021 8 Pages (including translation).

The European Patent Office (EPO) The Extended European Search Report for 19904490.0 dated Jan. 31, 2022 8 Pages.

The Japan Patent Office (JPO) Notification of Reasons for Refusal for Application No. 2021-526259 dated May 24, 2022 11 Pages (including translation).

NTT Docomo, Sprint, Verizon, AT&T, CMCC, Interim conclusions for KI#3 [online], 3GPP TSG SA WG2 #129bis, 3GPP, Nov. 30, 2018, S2-1812416, Retrieved from the Internet:URL: https://www.3gpp.org/ftp/tsg_sa/WG2_Arch/TSGS2_129BIS_West_Palm_Beach/Docs/S2-1812416.zip, [retrieved on May 13, 2022]. 2 pages.

Oracle, Deutsche Telekom, Cisco, AT&T, Sprint, Venzon, KDDI, NTT Docomo, China Mobile, Conclusion on KI#3 for Service Framework Implicit Discovery [online], 3GPP TSG SA WG2 #129BIS, 3GPP, Nov. 30, 2018, S2-1811987, Retrieved from the Internet:URL: https://www.3gpp.org/ftp/tsg_sa/WG2_Arch/TSGS2_129BIS_West_Palm_Beach/Docs/S2-1811987.zip, [retrieved on May 13, 2022]. 2 pages.

NTT Docomo et al., "Interim conclusions for KI#3", Nov. 26-30, 2018, SA WG2 Meeting #129-bis, West Palm Beach, FL, US.

"3rd Generation Partnership Project; Technical Specification Group Services and System Aspects; System Architecture for the 5G System; Stage 2 (Release 15)" Dec. 2018, 3GPP.

"3rd Generation Partnership Project; Technical Specification Group Services and System Aspects; Study on Enhancements to the Service-Based Architecture (Release 16)," Dec. 2018, 3GPP.

* cited by examiner

COMMUNICATION METHOD AND NETWORK DEVICE

RELATED APPLICATIONS

This application is a continuation application of PCT Patent Application No. PCT/CN2019/122414, filed on Dec. 2, 2019, which claims priority to Chinese Patent Application No. 201811603214.2, entitled "COMMUNICATION METHOD AND NETWORK DEVICE" filed with the National Intellectual Property Administration, PRC on Dec. 26, 2018, all of which are incorporated herein by reference in entirety.

FIELD OF THE TECHNOLOGY

The present disclosure relates to the field of communication technologies, and particularly, to a communication method, a network function (NF) entity, a network device, and a computer-readable storage medium.

BACKGROUND

In a service-based architecture of a 5G (fifth generation) mobile communication system, a service zone identifier (service zone ID) is proposed as one of metadata for discovering and selecting a service producer instance. The service zone ID is used for identifying a service zone of the service producer instance. A service framework support function (SFSF) supports discovery of a network function (NF) service based on a combination of a service set identifier (SET ID) and the service zone ID. The service zone ID can be used for indicating that a target NF service instance is to be selected from a service set in a specific service zone identified by the service zone ID.

The service zone ID may represent a service zone of the service producer instance. The service zone ID may also or alternatively represent a zone deployed by the service producer instance.

However, a communication protocol (TR23.742) according to certain existing technologies may only specify that a consumer service instance can select a service producer instance based on a service zone ID, but does not mention how a consumer service obtains the service zone ID of the service producer instance specifically, which may limit use of the service zone ID in the service framework.

SUMMARY

Embodiments of the present disclosure provide a communication method, an NF entity, a network device, and a computer-readable storage medium.

One aspect of the present disclosure provides a communication method performed by a first network function entity. The communication method includes determining a service zone ID, and transmitting information including the service zone ID to a second network function entity, where the service zone ID is used for the second network function entity to select a service producer instance from a service producer.

Another aspect of the present disclosure provides a first network function entity. The first network function entity includes a memory storing computer program instructions, and a processor coupled to the memory and configured to executing the computer program instructions and perform determining a service zone ID, and transmitting information including the service zone ID to a second network function entity, where the service zone ID is used for the second network function entity to select a service producer instance from a service producer.

Yet another aspect of the present disclosure provides a non-transitory computer-readable storage medium. The non-transitory computer-readable storage medium stores computer program instructions executable by at least one processor to perform determining a service zone ID, and transmitting information including the service zone ID to a network function entity, where the service zone ID is used for the network function entity to select a service producer instance from a service producer.

Other features and advantages of the present disclosure become obvious through the following detailed descriptions, or partly learned through practice of the present disclosure.

It is to be understand that the above general descriptions and the following detailed descriptions are merely exemplary, and are not intended to limit the present disclosure.

BRIEF DESCRIPTION OF THE DRAWINGS

To more clearly describe technical solutions of certain embodiments of the present disclosure, accompanying drawings are described below. The accompanying drawings are illustrative of embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings represent same or similar elements. In addition, the accompanying drawings are not necessarily drawn to scale.

DETAILED DESCRIPTION

To make objectives, technical solutions, and advantages of the present disclosure clearer and more comprehensible, certain embodiments of the present disclosure are further elaborated in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

In addition, the described features, structures, or characteristics may be combined in one or more exemplary implementations in any appropriate manner. In the following descriptions, specific details are provided to give a comprehensive understanding of the exemplary implementations of the present disclosure. However, a person skilled in the art is to be aware that, the technical solutions in the present disclosure may be implemented without one or more of the particular details, or another method, component, step, and the like may be used. In certain embodiments, well-known structures, methods, implementations, or operations are not shown or described in detail to avoid obscuring aspects of the present disclosure.

Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

Figure 1:
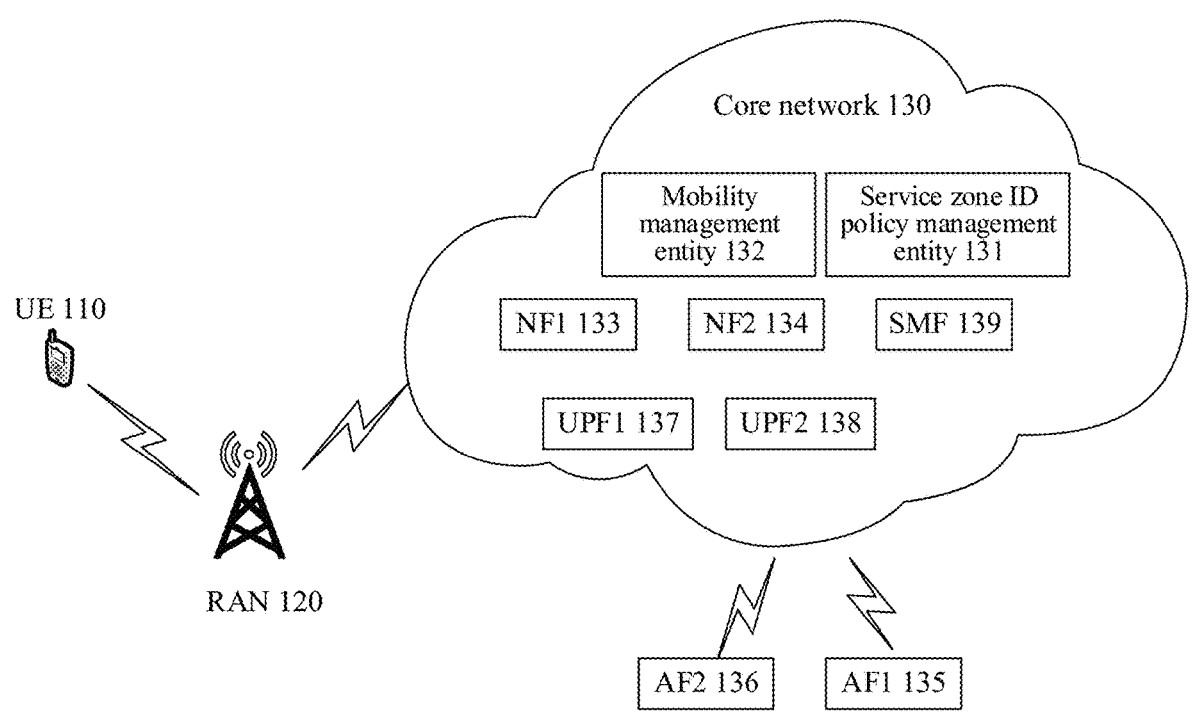
FIG. 1 is a schematic diagram of an architecture of an implementation environment of a communication method according to one or more embodiments of the present disclosure.

FIG. 1 is a schematic diagram of an implementation environment of a communication method of the present disclosure according to one or more embodiments.

As shown in FIG. 1, in a communication system such as a 5G communication system, user equipment (UE) 110 may communicate with a network 130 through an access network such as a radio access network (RAN) 120. In certain embodiments, the network 130 may be a core network entity. The network 130 may include one or more control plane network function (NF) entities and one or more user plane function (UPF) entities UPF1 137 and UPF2 138. The one or more control plane NF entities may be, for example, a service zone ID policy management entity 131, a mobility management entity 132, a session management function (SMF) entity SMF 139, or other NF entities NF1 133 and NF2 134 shown in FIG. 1. The network 130 may communicate with one or more implementation function (AF) entities. The AF entity may correspond to a proprietary service function of an operator or correspond to a service function provided by a third-party service provider, such as AF1 135 and AF2 136 shown in FIG. 1.

The architecture shown in FIG. 1 is a service architecture. Consumer services may perform a communication process by using one or more service producers. An SFSF supports use of a service zone ID to indicate that a target NF service instance is to be selected from a service producer set in a specific service zone identified by the service zone ID. For example, to perform communication, the mobility management entity 132 may select one or more NF service instances from a plurality of other NF service instances (such as a plurality of SM entity instances) based on the service zone ID, to be used for the communication process. In the technical solution according to the embodiments of the present disclosure, a technical solution is provided in which the service zone ID is determined by the service zone ID policy management entity 131 and transmitted to the NF entity (such as the mobility management entity 132 and the SMF entity SMF 139 or other NF entities), so that the NF entity may use the service zone ID to select the service producer instance. The embodiments of the present disclosure can provide a technical solution of selecting the service producer instance by using the service zone ID, so that the communication process is more efficient.

In one or more embodiments of the present disclosure, the term "based on" is employed herein interchangeably with the term "according to."

In certain embodiments, the term "service zone ID policy management entity" does not necessarily refer to a particular or a particular type of network entity, but is a general name of all NF entities having a service zone ID policy management (such as a generating service zone ID policy) function in the network. For example, the service zone ID policy management entity may include, but is not limited to, a policy control function (PCF) entity of the network, a unified data management (UDM) entity, a service selection policy management function in a service framework of the network, and the like.

In certain embodiments, the term "mobility management entity" does not necessarily refer to a particular or a particular type of network entity, but is a general name of all NF entities having a mobility management function in the network. For example, the mobility management may include, but is not limited to, an access and mobility management function (AMF) entity and the like.

In certain embodiments, network function entities described herein may be network devices having the functions or a combination of network devices having the functions. In certain particular embodiments, the network function entities may be core network function entities.

In certain embodiments, the term "User equipment" or "UE" may refer to any user equipment that can access the network and communicate with another network device or implementation server, including a mobile phone, a tablet computer, a notebook computer, various smart home appliances, and the like.

FIG. 1 and the description above are merely an exemplary embodiment of the implementation environment related to the communication method of the present disclosure. It is to be understood that the implementation environment applicable to the embodiments of the present disclosure may accommodate suitable variations.

Figure 2:
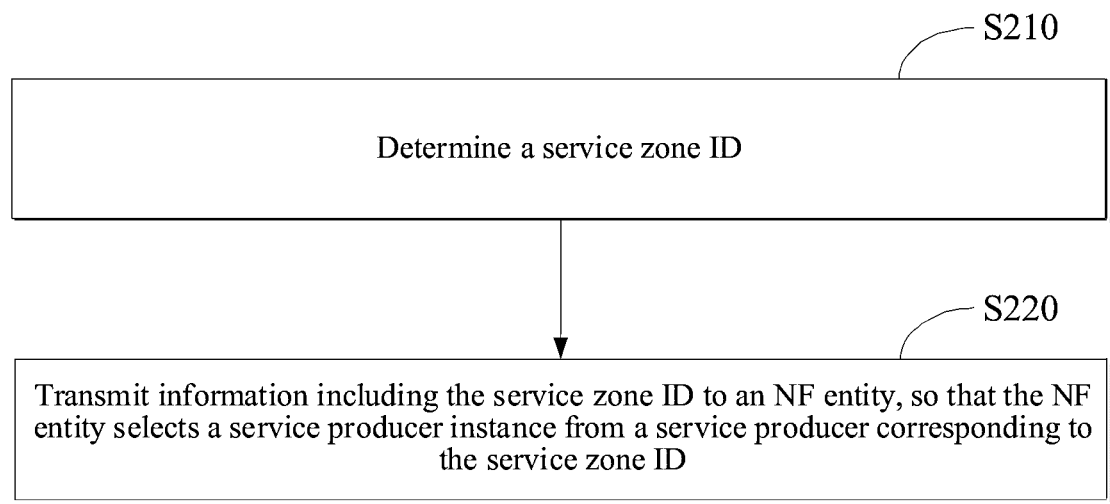
FIG. 2 is a schematic flowchart of a communication method according to one or more embodiments of the present disclosure.

FIG. 2 is a schematic flowchart of a communication method according to one or more embodiments of the present disclosure. The exemplary method may be performed by a service zone ID policy management entity. In other words, the communication method embodiment shown in FIG. 2 is a technical solution performed at the side of the service zone ID policy management entity. As shown in FIG. 2, the exemplary method includes steps S210 to S220:

Step S210: Determine a service zone ID.

The service zone ID policy management entity may determine the service zone ID in a plurality of manners, for example, receiving the service zone ID from another network entity, or generating or selecting the service zone ID based on known information.

In certain embodiments, the service zone ID policy management entity determines the service zone ID according to at least one of the following information: an operator policy; AF requirements (for example, the AF expects to route user equipment to a service zone, and preference information of the service zone may be transmitted to a network through an AF entity); local configuration data; and operation requirements of management and operations. For example, when or in response to determining a service producer in a zone may need to upgrade a service, the service producer may consider routing user equipment to another service zone to reduce impact of the service upgrade on user experience; after the upgrade is performed, the user equipment may be routed back to the service producer of the service zone ID by modifying the service zone ID.

The service zone ID policy management entity may determine and transmit the service zone ID in real time based on one or more pieces of the foregoing information, and may alternatively predetermine the service zone ID after obtaining the foregoing information, and transmit the determined service zone ID in real time or based on a request.

The service zone ID policy management entity may obtain at least one piece of the foregoing information and determine the service zone ID based on the obtained information. For example, a PCF entity determines the service zone ID according to the configuration data and the operation requirements of management and operations, so that the determined service zone ID is used for determining a service producer instance for a relevant consumer service instance of UE. In certain embodiments, a UDM entity determines the service zone ID according to configuration data such as subscription data of the UE, so that the determined service zone ID is used for determining a service producer instance for a relevant consumer service instance of UE. In certain embodiments, a function responsible for a service selection policy in a service framework determines a service zone ID of a service according to the operation requirements of management and operations, so that the determined service zone ID is used for determining a service producer instance of the service instance.

In certain embodiments, if the AF expects to influence selection of the service producer instance, a preferred service zone ID or service zone preference information may be included in a request and transmitted to a network exposure function (NEF) entity through the AF entity. The NEF entity determines whether to accept the request. If determining to accept the request, the NEF entity provides the preference information included in the request to the service zone ID policy management entity, so that the service zone ID policy management entity uses the preference information when determining the service zone ID. Alternatively, an operator device or the AF entity may directly transmit the preference information to the service zone ID policy management entity.

In certain embodiments, the determining a service zone ID further includes determining an applicable service type and/or time range of the service zone ID, that is, specifying service types for which the service zone ID is used.

Step S220: Transmit information including the service zone ID to an NF entity, so that the NF entity selects a service producer instance from a service producer corresponding to the service zone ID.

The NF entity in step S220 may refer to any network entity that can use the service zone ID to select the service producer instance, for example, a mobility management entity, an SMF entity, or another NF entity.

In a communication process, the service zone ID policy management entity may add the service zone ID determined in step S210 to other information, and transmit the information carrying the service zone ID to another or a second NF entity (such as a mobility management entity). For example, first information including the service zone ID may be transmitted to the NF entity in a registration process of the UE, or second information including the service zone ID may be transmitted to the NF entity in a protocol data unit (PDU) session establishment process of the UE. Alternatively, the service zone ID may be transmitted in both the UE registration process and the PDU session establishment process. A use priority of the service zone ID transmitted in the PDU session establishment process may be set to be higher than that of the service zone ID transmitted in the UE registration process. That is, when or in response to determining the NF entity receives both the first information and the second information, the service zone ID included in the second information is used, that is, the service zone ID transmitted in the PDU session establishment process is used.

In certain embodiments, the service zone ID policy management entity may further transmit at least one of the following besides the service zone ID: an applicable service type of the service zone ID; and an applicable time range of the service zone ID. For example, information including both the service zone ID and the applicable service type of the service zone ID may be transmitted. When or in response to determining the NF entity receives the service zone ID and a specified service type to which the service zone ID is applicable, the service zone ID may be used for the specified service type. In some examples, and when or in response to determining only the service zone ID is received and no applicable service type of the service zone ID is received, the service zone ID may be used for all service types.

Figure 3:
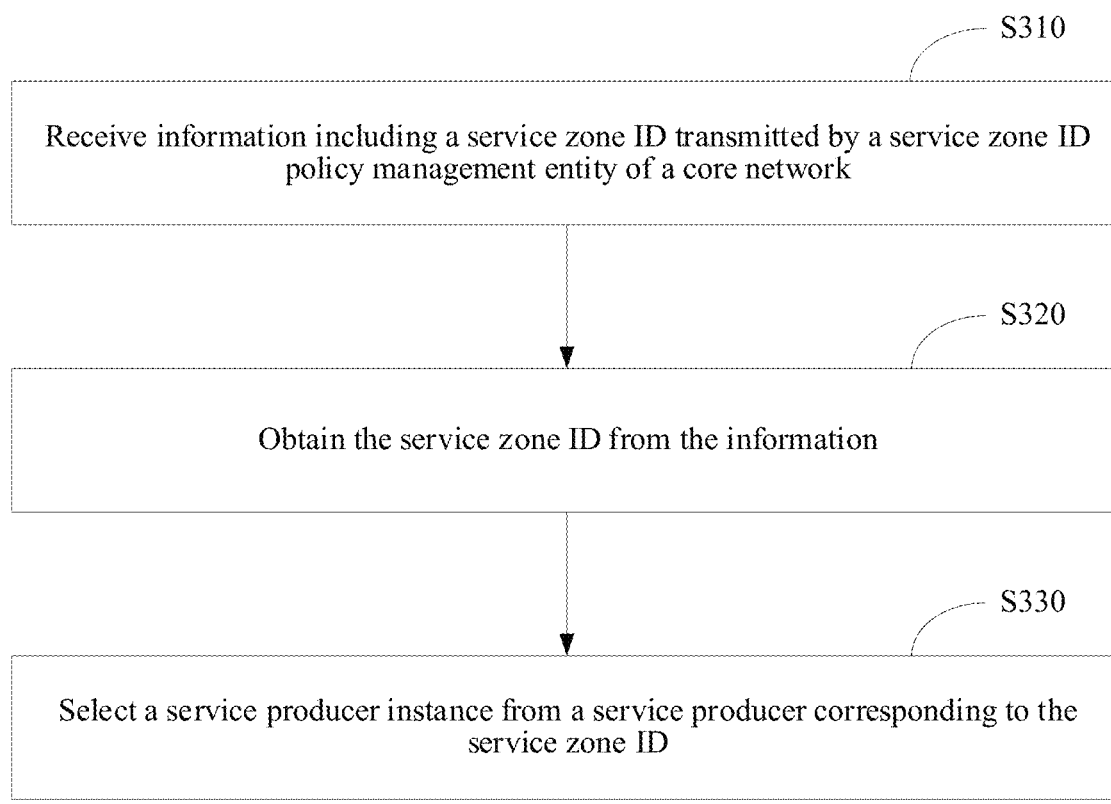
FIG. 3 is a schematic flowchart of a communication method according to one or more embodiments of the present disclosure.

FIG. 3 is a schematic flowchart of a communication method according to one or more embodiments of the present disclosure. The exemplary method may be performed by an NF entity (such as a mobility management entity, an SM entity, or another NF entity) of a network. The communication method shown in FIG. 3 may be a technical solution performed at a receiving entity side (such as a mobility management entity side). As shown in FIG. 3, the exemplary method includes steps S310 to S330:

Step S310: Receive information including a service zone ID transmitted by a service zone ID policy management entity of a network.

The NF entity may receive the information including the service zone ID in a process of communicating with the service zone ID policy management entity. For example, first information including the service zone ID transmitted by the service zone ID policy management entity is received in a registration process of UE. Alternatively, second information including the service zone ID transmitted by the service zone ID policy management entity is received in a PDU session establishment process of the UE. Alternatively, the information including the service zone ID is received in both the UE registration process and the PDU session establishment process. A use priority of the service zone ID received in the PDU session establishment process may be set to be higher than that of the service zone ID received in the UE registration process. That is, the service zone ID received in the PDU session establishment process is used.

Step S320: Obtain the service zone ID from the information.

For example, the service zone ID carried in the information may be obtained by retrieving a relevant specified field in the information.

Step S330: Select a service producer instance from a service producer corresponding to the service zone ID.

As described above, a service consumer transmits the service zone ID to an SFSF when transmitting a service call request, and the SFSF supports selection of the service producer instance from a service set of a specific service zone according to the service zone ID. After receiving the information including the service zone ID transmitted by the service zone ID policy management entity, the NF entity may obtain the service zone ID from the information, and select a service producer corresponding to the service zone ID according to the service zone ID. When or in response to determining the service zone ID and a specified service type to which the service zone ID is applicable are received, the NF entity may use the service zone ID to select a service producer of the specified service type. When or in response to determining only the service zone ID is received and no applicable service type of the service zone ID is received, the service zone ID may be used for selecting service producers of all service types.

In certain embodiments, the NF entity includes a new NF entity and an old NF entity previously used. Therefore, switching between the new and the old NF entities serving the UE may occur, that is, switching from the old NF entity to the new NF entity. In this case, the old NF entity may transmit received information of a service zone ID that is still valid (and a specified service type) to the new NF entity, and the new NF entity receives the service zone ID from the old NF entity and continues to use the service zone ID. When or in response to determining the new NF entity receives new service zone ID information from the service zone ID policy management entity, a use priority of the service zone ID received from the old NF entity may be set to be lower than that of the service zone ID received from the service zone ID policy management entity. Alternatively, the new NF entity uses the new service zone ID information received from the service zone ID policy management entity to overwrite the service zone ID information received from the old NF entity.

In certain embodiments, the NF entity may transmit the received service zone ID (and the specified service type and/or an applicable time range) to another NF entity that may need the service zone ID (for example, transmitting from an AMF to an SMF).

Figure 4:
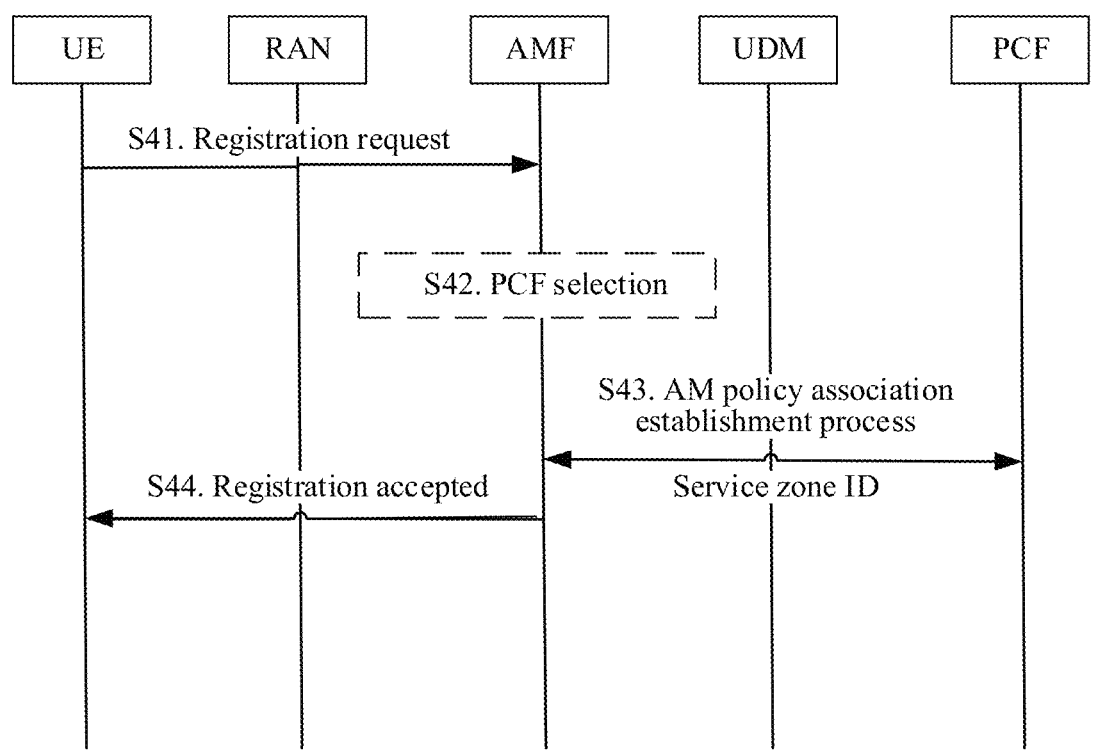
FIG. 4 is a schematic diagram of transmitting and receiving a service zone ID in a UE registration process according to one or more embodiments of the present disclosure.

FIG. 4 is a schematic diagram of transmitting and receiving a service zone ID in a UE registration process according to an exemplary embodiment of the present disclosure. In the example, the UE registration process includes an AM policy association establishment process. A service zone ID policy management entity may be a PCF entity, and an NF entity receiving the service zone ID may be an AMF entity used as an example of a mobility management entity. As shown in FIG. 4, the PCF entity transmits information including a determined service zone ID to the AMF entity in the AM policy association establishment process, and the AMF entity receives the information and obtains the service zone ID from the information. Therefore, the receiving, in a registration process of UE, first information including the service zone ID transmitted by the service zone ID policy management entity includes: receiving, by the AMF entity in the AM policy association establishment process, the first information including the service zone ID transmitted by the PCF entity.

An exemplary UE registration process is shown in FIG. 4, and the process shows only some steps more relevant to UE registration and omits some less relevant steps. As shown in FIG. 4, the UE registration process may include steps S41 to S44:

Step S41: UE transmits a registration request to an AMF.
Step S42: The AMF selects a PCF.
Step S43: Perform an AM policy association establishment process between the AMF and the PCF. Names of the process and the policy are not limited in the present disclosure, and any service call type of a mobility management policy of a user obtained from the PCF is applicable.

The process may be initiated by the AMF to the PCF. In certain embodiments, the process may alternatively be initiated by another entity (such as the PCF). This is not limited in the present disclosure. In the process, there is information exchange between the AMF and the PCF. The PCF may add a determined service zone ID (or further add an applicable service type and/or time range) to exchange information with the AMF and transmit the exchange information to the AMF. The AMF then receives the exchange information and obtains the service zone ID from the exchange information.

In addition to the service zone ID, the PCF may further transmit, to the AMF, a specified service type and/or a time range to which the service zone ID is applicable. For example, information transmitted by the PCF to the AMF in the process includes: —Service Zone ID: 1, Service type: ServiceType 1, ServiceType 2, —Service Zone ID: 2, Service type: ServiceType 3, ServiceType 4

In the foregoing information example, the service zone ID 1 and the service zone ID 2 are included, and it is specified that service types of the service zone ID 1 are service type 1 and service type 2, and service types of the service zone ID 2 are service type 3 and service type 4. After receiving such information, the AMF selects a service producer instance in a service zone with the service zone ID 1 when selecting a service producer of the service type 1 or the service type 2, and selects a service producer instance in a service zone with the service zone ID 2 when selecting a service producer of the service type 3 or the service type 4. For other service types, the AMF selects a service producer instance having any service zone ID. The information example is also applicable to other embodiments described below.

Step S44: The AMF transmits a registration acceptance message to the UE.

Figure 5:
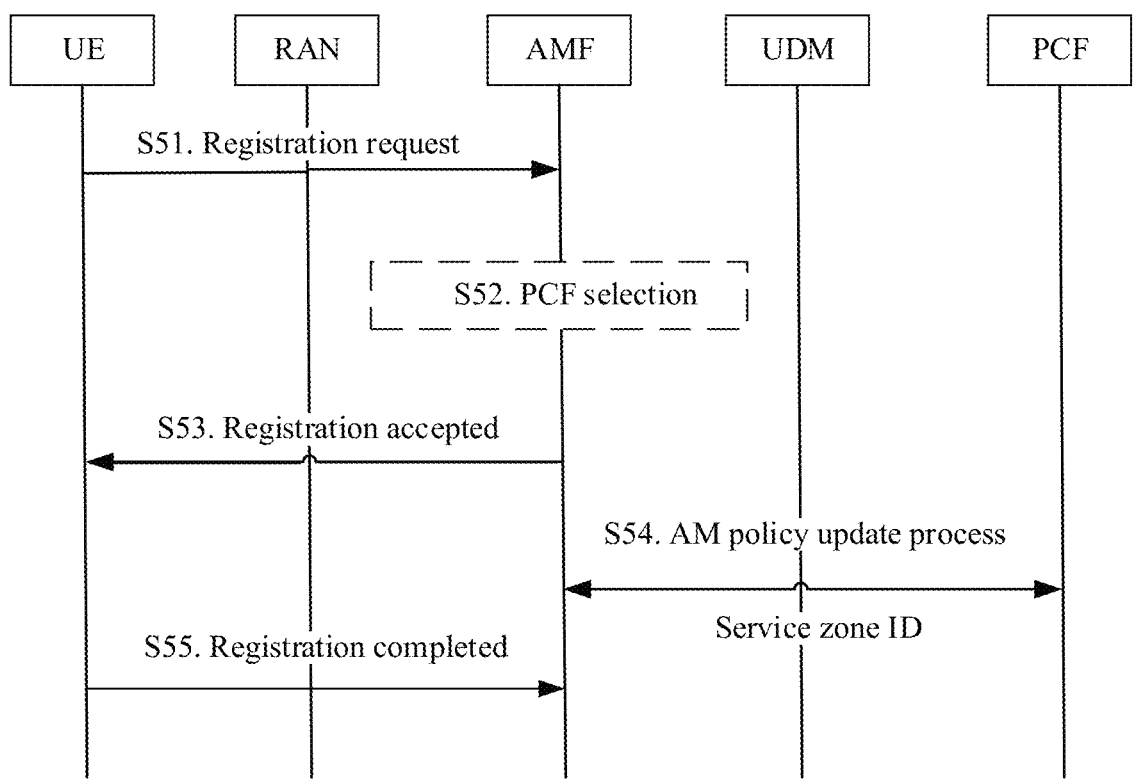
FIG. 5 is a schematic diagram of transmitting and receiving a service zone ID in a UE registration process according to one or more embodiments of the present disclosure.

FIG. 5 is a schematic diagram of transmitting and receiving a service zone ID in a UE registration process according to another exemplary embodiment of the present disclosure. In the example, the UE registration process includes an AM policy update process. A service zone ID policy management entity may be a PCF entity, and an NF entity receiving the service zone ID may be an AMF entity used as an example of a mobility management entity. As shown in FIG. 5, the PCF entity transmits information including a determined service zone ID to the AMF entity in the AM policy update process, and the AMF entity receives the information and obtains the service zone ID from the information. Therefore, the receiving, in a registration process of UE, first information including the service zone ID transmitted by the service zone ID policy management entity includes: receiving, by the AMF entity in the AM policy update process, the first information including the service zone ID transmitted by the PCF entity.

An exemplary UE registration process is shown in FIG. 5, and the process shows only some steps relatively relevant to UE registration and omits some less relevant steps. As shown in FIG. 5, the UE registration process may include steps S51 to S55:

Step S51: UE transmits a registration request to an AMF.
Step S52: The AMF selects a PCF.
Step S53: The AMF transmits a registration acceptance message to the UE.
Step S54: Perform an AM policy update process between the AMF and the PCF.

The process may be initiated by the AMF to the PCF. It is to be understood that the process may alternatively be initiated by another entity (such as the PCF). This is not limited in the present disclosure. The process may be performed after a UE policy association establishment process, or in parallel with the UE policy association establishment process. In the process, there is information exchange between the AMF and the PCF. The PCF may add a determined service zone ID (or further add an applicable service type and/or time range) to exchange information with the AMF and transmit the exchange information to the AMF. The AMF then receives the exchange information and obtains the service zone ID from the exchange information.

In addition to the service zone ID, the PCF may further transmit, to the AMF, a specified service type and/or a time range to which the service zone ID is applicable.

Step S55: Perform the registration.

As long as the UE does not have a de-registration process, the service zone ID and the applicable service type thereof transmitted and received in the foregoing exemplary UE registration process in FIG. 4 and FIG. 5 are valid for all transactions of the UE before de-registration.

Figure 6:
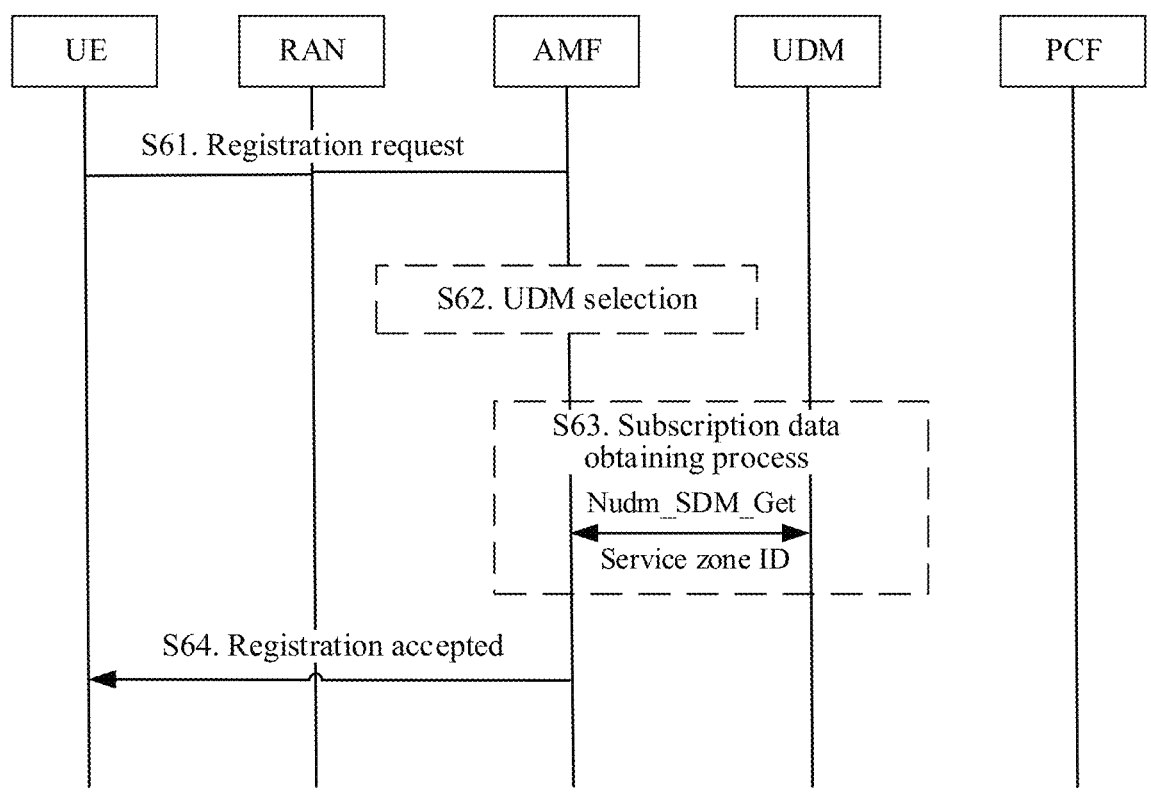
FIG. 6 is a schematic diagram of transmitting and receiving a service zone ID in a UE registration process according to one or more embodiments of the present disclosure.

FIG. 6 is a schematic diagram of transmitting and receiving a service zone ID in a UE registration process according to one or more embodiments of the present disclosure. According to FIG. 6, the UE registration process includes a subscription data obtaining process. A service zone ID policy management entity may be a UDM entity, and an NF entity receiving the service zone ID may be an AMF entity used as an example of a mobility management entity. As shown in FIG. 6, the UDM entity transmits information including a determined service zone ID to the AMF entity in the subscription data obtaining process, and the AMF entity receives the information and obtains the service zone ID from the information. Therefore, the receiving, in a registration process of UE, first information including the service zone ID transmitted by the service zone ID policy management entity includes: receiving, by the AMF entity in the subscription data obtaining process, the first information including the service zone ID transmitted by the UDM entity.

An exemplary UE registration process is shown in FIG. 6, and the process shows only some steps relatively relevant to UE registration and omits some less relevant steps. As shown in FIG. 6, the UE registration process may include steps S61 to S64:

Step S61: UE transmits a registration request to an AMF.

Step S62: The AMF selects a UDM.

Step S63: Perform a subscription data obtaining process between the AMF and the UDM.

The process may be initiated by the AMF to the UDM. For example, as shown in FIG. 6, the AMF transmits Nudm_SDM_Get to the UDM to obtain subscription data selected by the SMF, a UE context, and access and mobility subscription data from SMF data. As a response to the Nudm_SDM_Get, the UDM may add a determined service zone ID (or further add an applicable service type) to exchange information with the AMF and transmit the exchange information to the AMF. The AMF then receives the exchange information and obtains the service zone ID from the exchange information. It is to be understood that the process may alternatively be initiated by another NF entity (such as the PCF). This is not limited in the present disclosure. A name of a service type provided by the UDM is not limited in the present disclosure, and any service call type of subscription information of a user obtained from the UDM is applicable.

In addition to the service zone ID, the UDM may further transmit, to the AMF, a specified service type and/or a time range to which the service zone ID is applicable.

Step S64: The AMF transmits a registration acceptance message to the UE.

In certain embodiments, as long as the UE is not re-registered, the service zone ID and the applicable service type thereof transmitted and received in the foregoing exemplary UE registration process in FIG. 4 to FIG. 6 are valid for all transactions of the UE.

Figure 7:
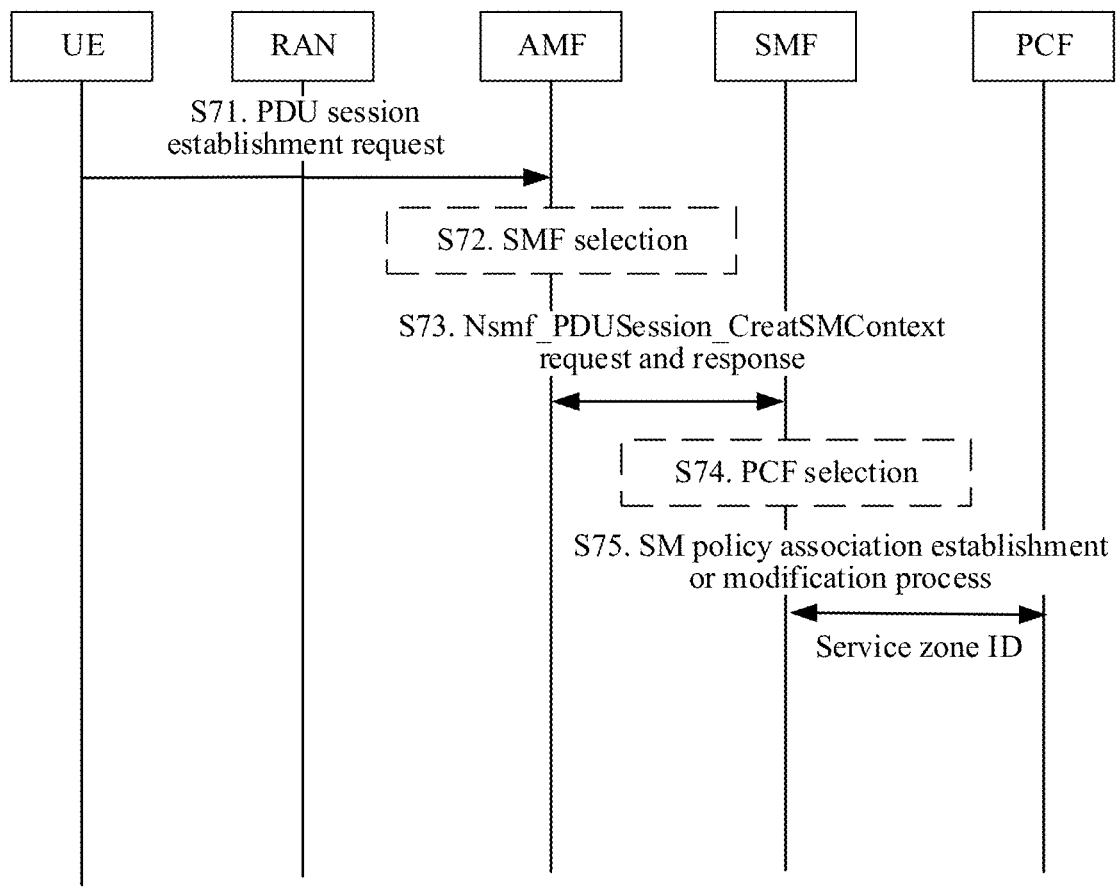
FIG. 7 is a schematic diagram of transmitting and receiving a service zone ID in a PDU session establishment process according to one or more embodiments of the present disclosure.

FIG. 7 is a schematic diagram of transmitting and receiving a service zone ID in a PDU session establishment process according to one or more embodiments of the present disclosure. In this example, the PDU session establishment process includes an SM policy association establishment or modification process, a service zone ID policy management entity may be a PCF entity, and an NF entity receiving the service zone ID may be an SMF entity used as an example of the NF entity. As shown in FIG. 7, the PCF entity transmits information including a determined service zone ID to the SMF entity in the SM policy association establishment or modification process, and the SMF entity receives the information and obtains the service zone ID from the information. Therefore, the receiving, in a PDU session establishment process of the UE, second information including the service zone ID transmitted by the service zone ID policy management entity includes: receiving, by the SMF entity in the SM policy association establishment or modification process, the second information including the service zone ID transmitted by the service zone ID policy management entity.

An exemplary PDU session establishment process is shown in FIG. 7, and the process shows only some steps relatively relevant to PDU session establishment and omits some less relevant steps. Therefore, the process is not a complete PDU session establishment process. As shown in FIG. 7, the PDU session establishment process may include steps S71 to S75:

Step S71: UE transmits a PDU session establishment request to an AMF.

Step S72: The AMF selects an SMF based on a relevant selection policy.

When or in response to determining that a service zone ID used for such a service type of the UE is already received in a UE registration process, the AMF selects, in this step, an SMF according to the received service zone ID.

Step S73: Transmit a session management context establishment or update (Nsmf_PDUSession_CreatSMContext) request and response between the AMF and the SMF.

Step S74: The SMF selects the PCF based on a relevant selection standard.

When or in response to determining the SMF learns the service zone ID used for such a service type received in the UE registration process, the SMF may select the PCF according to the service zone ID.

Step S75: Perform an SM policy association establishment or modification process between the SMF and the PCF.

The process may be initiated by the SMF to the PCF or by another NF entity (such as the PCF). In the process, there is information exchange between the SMF and the PCF. The PCF may add a determined service zone ID (or further add an applicable service type and/or time range) to exchange information with the SMF and transmit the exchange information to the SMF. The SMF then receives the exchange information and obtains the service zone ID from the exchange information.

In addition to the service zone ID, the PCF may further transmit, to the SMF, a specified service type and/or a time range to which the service zone ID is applicable.

In certain embodiments, the service zone ID and the applicable service type thereof transmitted and received in the exemplary PDU session establishment in FIG. 7 are valid for the PDU session of the UE.

A name of a service type of a service zone ID provided by the PCF is not limited in the present disclosure, and any service call type of policy information obtained from the PCF is applicable.

The exemplary communication method described above according to the embodiments of the present disclosure provides a technical solution in which a service zone ID is determined and transmitted to another NF entity of a network by a service zone ID policy management entity, so that the NF entity receiving the service zone ID can select a service producer instance in a corresponding service zone according to the service zone ID, thus implementing the effective use of the service zone ID and improving communication efficiency.

Figure 8:
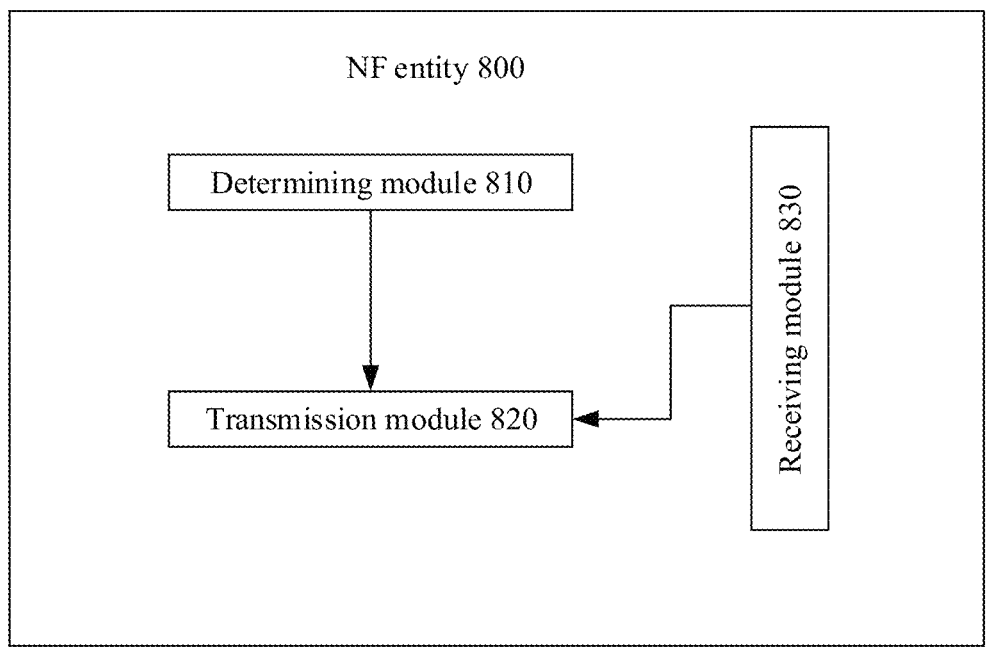
FIG. 8 is a schematic block diagram of components of an NF entity according to one or more embodiments of the present disclosure.

According to another aspect of the embodiments of the present disclosure, an NF entity is further provided. The NF entity may be a network device in a network that can determine a service zone ID and transmit the service zone ID to another NF entity, for example, the NF entity may be a service zone ID policy management entity of the network. FIG. 8 is a schematic block diagram of components of an NF entity according to an exemplary embodiment of the present disclosure. As shown in the example in FIG. 8, the NF entity 800 may include: a determining module 810, configured to determine a service zone ID; and a transmission module 820, configured to transmit information including the service zone ID to another NF entity.

According to an exemplary embodiment, the determining module 810 may be configured to determine the service zone ID according to at least one of the following: an operator policy; AF requirements (for example, the AF expects to route user equipment to a service zone, and preference information of the service zone may be transmitted to a network through an AF entity); local configuration data; and operation requirements of management and operations. For example, when or in response to determining a service producer in a zone may need to upgrade a service, the service producer may consider routing user equipment to another service zone to reduce impact of the service upgrade on user experience; after the upgrade is performed, the user equipment may be routed back to the service producer of the service zone ID by modifying the service zone ID.

According to an exemplary embodiment, the transmission module 820 may be further configured to perform at least one of the following: transmitting, in a registration process of UE, first information including the service zone ID to the another NF entity; and transmitting, in a PDU session establishment process of the UE, second information including the service zone ID to the another NF entity.

According to an exemplary embodiment, the NF entity 800 is a PCF entity, the another NF entity includes an AMF entity, and the registration process includes an AM policy association establishment process. The transmission module 820 may be further configured to: transmit, in the AM policy association establishment process, the first information including the service zone ID to the AMF entity.

According to an exemplary embodiment, the NF entity 800 is a PCF entity, the another NF entity includes an AMF entity, and the registration process includes an AM policy update process. The transmission module 820 may be further configured to: transmit, in the AM policy update process, the first information including the service zone ID to the AMF entity.

According to an exemplary embodiment, the NF entity 800 is a UDM entity, the another NF entity includes an AMF entity, and the registration process includes a subscription data obtaining process. The transmission module 820 may be further configured to: transmit, in the subscription data obtaining process, the first information including the service zone ID to the AMF entity.

According to an exemplary embodiment, the NF entity 800 is a PCF entity, the another NF entity includes an SMF entity, and the PDU session establishment process includes an SM policy association establishment or modification process. The transmission module 820 may be further configured to: transmit, in the SM policy association establishment or modification process, the second information including the service zone ID to the SMF entity.

According to an exemplary embodiment, the transmission module 820 may be further configured to: transmit, to the another NF entity, information including at least one of the following: an applicable service type of the service zone ID; and an applicable time range of the service zone ID.

According to an exemplary embodiment, the NF entity 800 may further include: a receiving module 830, configured to receive the AF requirements from an NEF entity or an AF entity.

Figure 9:
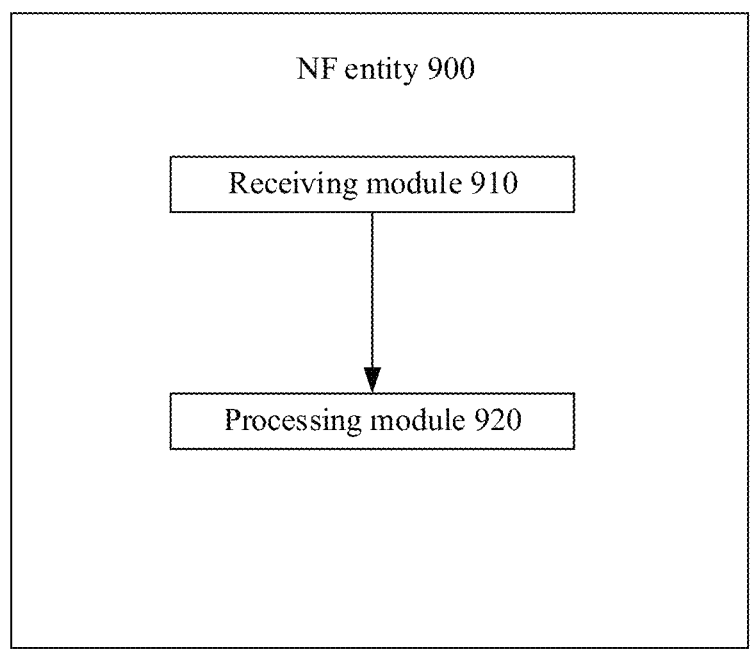
FIG. 9 is a schematic block diagram of components of an NF entity according to one or more embodiments of the present disclosure.

According to another aspect of the embodiments of the present disclosure, another NF entity is further provided. The NF entity may be a network device in a network that can receive a service zone ID from a service zone ID policy management entity and select a service producer instance according to the service zone ID. For example, the NF entity may be a mobility management entity or an SMF entity. FIG. 9 is a schematic block diagram of components of an exemplary embodiment of such an NF entity. As shown in the example in FIG. 9, the NF entity 900 may include: a receiving module 910, configured to receive information including a service zone ID transmitted by a service zone ID policy management entity of a network; and a processing module 920, configured to obtain the service zone ID from the information, and select a service producer instance from a service producer corresponding to the service zone ID.

According to an exemplary embodiment, the receiving module 910 may be further configured to: receive, in a registration process of UE, first information including the service zone ID transmitted by the service zone ID policy management entity; and receive, in a PDU session establishment process of the UE, second information including the service zone ID transmitted by the service zone ID policy management entity.

According to an exemplary embodiment, the NF entity 900 may be an AMF entity, the service zone ID policy management entity includes a PCF entity, and the registration process includes an AM policy association establishment process. The receiving module 910 may be further configured to: receive, in the AM policy association establishment process, first information including the service zone ID transmitted by the PCF entity.

According to an exemplary embodiment, the NF entity 900 may be an AMF entity, the service zone ID policy management entity is a PCF entity, and the registration process includes an AM policy update process. The receiving module 910 may be further configured to: receive, in the AM policy update process of the UE, the first information including the service zone ID transmitted by the PCF entity.

According to an exemplary embodiment, the NF entity 900 may be an AMF entity, the service zone ID policy management entity is a UDM entity, and the registration process includes a subscription data obtaining process. The receiving module 910 may be further configured to: transmit, in the subscription data obtaining process, first information including the service zone ID transmitted by the UDM entity.

According to an exemplary embodiment, the NF entity 900 may be an SMF entity, the service zone ID policy management entity is a PCF entity, and the PDU session establishment process includes an SM policy association establishment or modification process. The receiving module 910 may be further configured to: receive, in the SM policy association establishment or modification process, second information including the service zone ID transmitted by the service zone ID policy management entity.

According to an exemplary embodiment, the processing module 920 may be further configured to: when or in response to determining the receiving module receives both the first information and the second information, set use priority of the service zone ID included in the second information to be higher than that of the service zone ID included in the first information.

According to an exemplary embodiment, the NF entity 900 may be a new NF entity after switching from an old NF entity previously used, and the receiving module 910 may be further configured to: receive a service zone ID that is obtained by the old NF entity for selecting a service producer.

The processing module 920 may be further configured to set a use priority of the service zone ID from the old NF entity to be lower than that of the service zone ID included in the information transmitted by the service zone ID policy management entity.

For implementation processes and related details of the functions and effects of the various units/modules in the foregoing NF entity, refer to the implementation processes of the corresponding steps in the foregoing method embodiments. Details are not described herein again.

The NF entity embodiments in the foregoing embodiments may be implemented by using hardware, software, firmware, or a combination thereof, and may be implemented as an independent apparatus, or may be implemented as a logical integrated system in which composition units/modules are dispersed in one or more computing devices and execute corresponding functions respectively.

The units/modules constituting the NF entity in the foregoing embodiments are divided according to logical functions, and may be re-divided according to the logical functions. For example, the apparatus may be implemented by using more or fewer units/modules. The composition units/modules may be separately implemented by using hardware, software, firmware, or a combination thereof. The composition units/modules may be independent components, or may be an integrated unit/module in which a plurality of components are combined to perform corresponding logical functions. The hardware, software, firmware, or the combination thereof may include: a separate hardware component, a functional module implemented in a programming manner, a functional module implemented through a programmable logic device, or the like, or a combination of the foregoing manners.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software. Each module/unit or submodule/subunit can be implemented using one or more processors (or processors and memory). Likewise, a processor (or processor and memory) can be used to implement one or more modules/units or submodules/subunits. Moreover, each module/unit may be developed using a computer programming language, or be part of an overall module/unit that is developed using a computer programming language to encompass the functionalities of each module/unit.

According to an exemplary embodiment, the NF entity may be implemented as a network device. The network device includes a memory and a processor, the memory stores a computer program, and the computer program, when executed by the processor, causes the network device to perform any method according to the foregoing communication method embodiments, or the computer program, when executed by the processor, causes the network device to implement the functions implemented by the composition units/modules of the foregoing NF entity embodiments.

The processor described in the foregoing embodiment may be a single processing unit such as a central processing unit (CPU), or may be a distributed processor system including a plurality of distributed processing units/processors.

The memory in the foregoing embodiment may include one or more memories, which may be internal memories of a computing device, for example, various transient or non-transient memories, or may be an external storage apparatus connected to the computing device through a memory interface.

Figure 10:
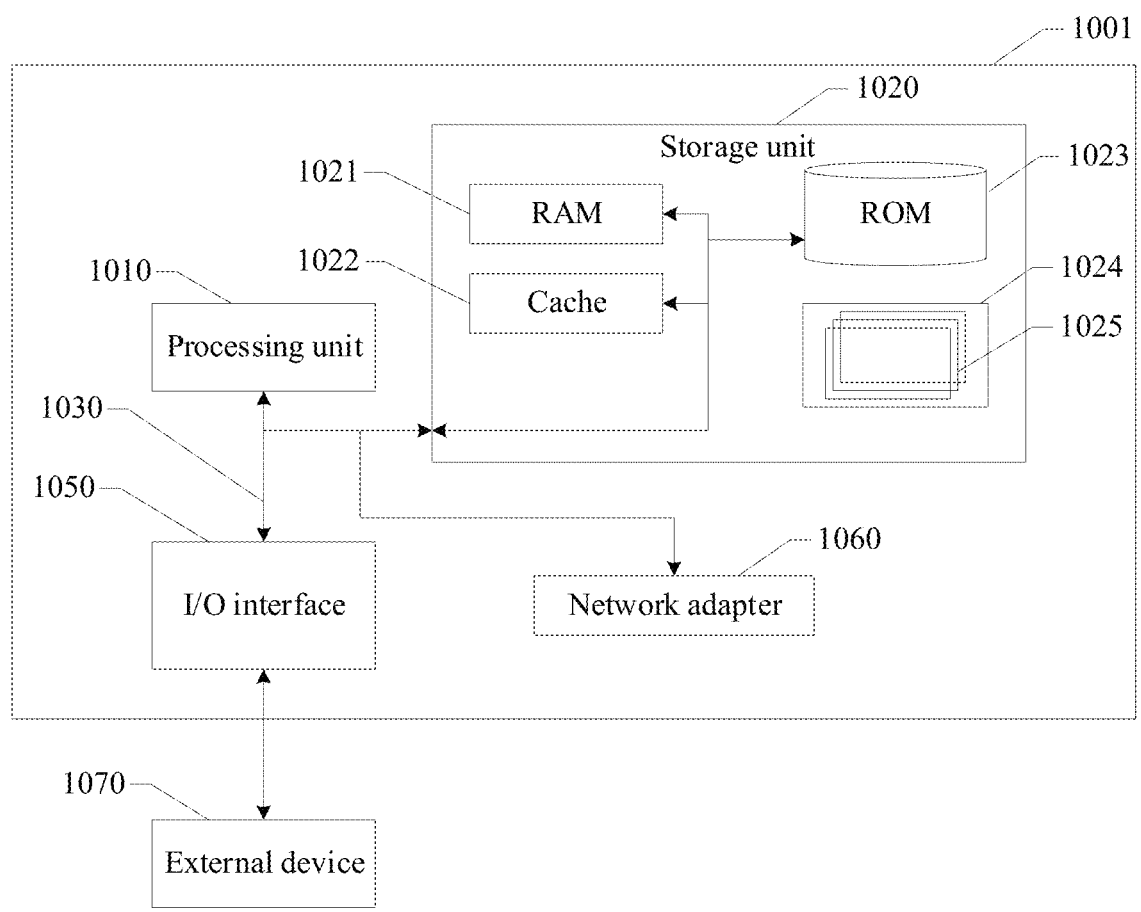
FIG. 10 is a schematic block diagram of components of a network device according to one or more embodiments of the present disclosure.

FIG. 10 is a schematic block diagram of components of an exemplary embodiment of such a network device 1001. As shown in FIG. 10, the network device may include, but is not limited to: at least one processing unit 1010, at least one storage unit 1020, and a bus 1030 connecting different system components (including the storage unit 1020 and the processing unit 1010).

The storage unit stores program code, and the program code may be executed by the processing unit 1010, so that the processing unit 1010 performs the steps according to the exemplary implementations of the foregoing exemplary methods in the specification. For example, the processing unit 1010 may perform the steps shown in FIG. 2 to FIG. 6.

The storage unit 1020 may include a readable medium in the form of a volatile storage unit, for example, a random-access memory (RAM) 1021 and/or a cache storage unit 1022, and may further include a read-only memory (ROM) 1023.

The storage unit 1020 may further include a program/utility 1024 having a set of (at least one) program modules 1025. Such a program module 1025 includes, but is not limited to: an operating system, one or more implementation programs, other program modules, and program data. Each or a combination of these examples may include implementation of a network environment.

The bus 1030 may represent one or more of several types of bus structures, including a storage unit bus or storage unit controller, a peripheral bus, an accelerated graphics port, a processing unit, or a local bus using any one of a plurality of bus structures.

The network device may alternatively communicate with one or more external devices 1070 (for example, a keyboard, a pointing device, and a Bluetooth device), or may communicate with one or more devices that enable a user to interact with the network device, and/or communicate with any device (for example, a router or a modem) that enables the network device to communicate with one or more other computing devices. Such communication may be performed through an input/output (I/O) interface 1050. In addition, the network device may further communicate with one or more networks (for example, a local area network (LAN), a wide area network (WAN), and/or a public network such as the Internet) by using a network adapter 1060. As shown in FIG. 10, the network adapter 1060 communicates with other modules of the network device through the bus 1030. It is to be understood that although not shown in the figure, the network device may be implemented by using other hardware and/or software modules, including but not limited to: microcode, a device drive, a redundancy processing unit, an external magnetic disk drive array, a RAID system, a tape drive, a data backup storage system, and the like.

In an exemplary embodiment of the present disclosure, a computer-readable storage medium is further provided, storing computer-readable instructions, the computer-readable instructions, when executed by a processor of a computer, causing the computer to perform the method embodiments described in the foregoing method embodiments.

According to an embodiment of the present disclosure, a program product for implementing the methods in the foregoing method embodiments is further provided. The program product may use a portable compact disc read-only memory (CD-ROM) and include program code, and may be run on a terminal device such as a personal computer. However, the program product of the present disclosure is not limited thereto. In this file, the readable storage medium may be any tangible medium including or storing a program, and the program may be used by or in combination with an instruction execution system, apparatus, or device.

The program product may be any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a read-only memory (ROM), an erasable programmable read-only memory (EPROM or flash memory), an optical fiber, a portable CD-ROM, an optical storage device, a magnetic storage device, or any appropriate combination thereof.

The computer-readable signal medium may include a data signal propagated in a baseband or as part of a carrier, and stores readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to send, propagate, or transmit a program used by or used in combination with an instruction execution system, an apparatus, or a device.

The program code included in the readable medium may be transmitted by using any suitable medium, including but not limited to, wireless transmission, a wire, a cable, radio frequency (RF) or the like, or any suitable combination of thereof.

The computer program code configured to execute the operations of the present disclosure may be written by using any combination of one or more program design languages. The program design languages include an object-oriented program design language such as Java and C++, and also include a conventional procedural program design language such as a "C" or similar program design language. The program code may be executed on a user computing device, partially executed on a user device, executed as an independent software package, partially executed on a user computing device and partially executed on a remote computing device, or completely executed on a remote computing device or server. When or in response to determining a remote computing device is involved, the remote computing device may be connected to a user computing device through any type of network including a LAN or a WAN, or may be connected to an external computing device (for example, through the Internet by using an Internet service provider).

Although several modules or units of a device for action execution are mentioned in the foregoing detailed descriptions, the division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied.

In addition, although the steps of the method in the present disclosure are described in the accompanying drawings in a specific sequence, this does not require or imply that such steps need to be performed according to the specific sequence, or all shown steps need to be performed to achieve an expected result. Additionally or alternatively, some steps may be omitted, a plurality of steps may be combined into one step, and/or one step may be decomposed into a plurality of steps for execution, and the like.

Through the description of the foregoing embodiments, a person skilled in the art can easily understand that the exemplary implementations described herein may be implemented by software, or may be implemented by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or a network and includes several instructions for instructing a computing device (which may be a personal computer, a server, a mobile terminal, a network device, or the like) to perform the methods described in the implementations of the present disclosure.

After considering the specification and practicing the present disclosure, a person skilled in the art can easily conceive of other implementations of the present disclosure. The present disclosure is intended to cover any variation, use, or adaptive changes of the present disclosure. Such variations, uses, or adaptive changes follow the general principles of the present disclosure and include common general knowledge or common technical means in the technical field that are not disclosed in the present disclosure. The specification and the embodiments are merely illustrative, and the true scope and spirit of the present disclosure are subject to the claims.

What is claimed is:

1. A communication method, performed by a first network function entity including a PCF (policy control function) entity or a UDM (unified data management) entity, the method comprising:

determining a service zone ID; and transmitting the service zone ID to a second network function entity including an AMF (access and mobility management function) entity or an SMF (session management function) entity, wherein the service zone ID is used for the second network function entity to select a service producer instance from a service producer, wherein the service zone ID includes a first service zone ID and a second service zone ID, and wherein transmitting the service zone ID comprises:
  transmitting, by the PCF entity of the first network function entity, in a registration process of a UE (user equipment), the first service zone ID to the AMF entity of the second network function entity;
  transmitting, in a PDU (protocol data unit) session establishment process of the UE, the second service zone ID to the second network function entity; and
  assigning to the first service zone ID a first use priority and assigning to the second service zone ID a second use priority higher than the first use priority, wherein the second network function entity, in response to receiving both the first service zone ID and the second service zone ID, uses the second service zone ID ahead of or instead of the first service zone ID.

2. The method according to claim 1, wherein determining the service zone ID comprises:
  determining the service zone ID according to at least one of the following: an operator policy; application function ("AF") requirements; local configuration data; and operation requirements of management and operations.

3. The method according to claim 2, further comprising:
  receiving the AF requirements from a network exposure function ("NEF") entity or an AF entity.

4. The method according to claim 1, wherein the second network function entity includes the AMF entity, the first network function entity includes the PCF entity, and the registration process includes an access management policy update process, and wherein transmitting, in the registration process of the UE, the first service zone ID to the second network function entity comprises:
  transmitting, by the PCF entity in the AM policy update process, the first service zone ID to the AMF entity.

5. The method according to claim 1, wherein the second network function entity includes the AMF entity, the first network function entity includes the UDM entity, and the registration process includes a subscription data obtaining process, and wherein transmitting, in the registration process of the UE, the first service zone ID to the second network function entity comprises:
  transmitting, by the UDM entity in the subscription data obtaining process, the first service zone ID to the AMF entity.

6. The method according to claim 1, wherein the second network function entity includes the SMF entity, the first network function entity includes the PCF entity, and the PDU session establishment process includes a session management (SM) policy association establishment or modification process, and wherein transmitting, in the PDU session establishment process of the UE, the second service zone ID to the second network function entity comprises:
  transmitting, by the PCF entity in the SM policy association establishment or modification process, the second service zone ID to the SMF entity.

7. The method according to claim 1, wherein transmitting the service zone ID to the second network function entity comprises:
  transmitting, to the second network function entity, the service zone ID and at least one of the following: information of an applicable service type of the service zone ID; and an applicable time range of the service zone ID.

8. The method according to claim 1, wherein the first service zone ID corresponds to a first service zone, and the method further comprises:
  obtaining a determination that the service producer upgrades a service; and
  determining to use the second service ID to route the UE from the first service zone to a second service zone corresponding to the second service ID.

9. The method according to claim 1, further comprising:
  transmitting the second service zone ID along with a service type to the second network function entity, wherein the second network function entity selects a service producer according to the second service zone ID and the service type; or
  transmitting the second service zone ID without the service type to the second network function entity, wherein the second network function entity selects the service producer according to the second service zone ID for all service types.

10. The method according to claim 1, wherein the second network function entity is an old second network function entity, and the old second network function entity forwards the second service zone ID to a new second network function entity, and the method further comprises:
  transmitting, by the first network function entity, a third service zone ID to the new second network function entity; and
  assigning, by the first network function entity, a third use priority to the third service zone ID, the third use priority being higher than the second use priority, wherein the new second network function entity, in response to receiving both the second service zone ID and the third service zone ID, uses the third service zone ID ahead of or instead of the second service zone ID.

11. A first network function ("NF") entity including a PCF (policy control function) entity or a UDM (unified data management) entity, the first NF entity comprising: a memory storing computer program instructions; and a processor coupled to the memory and configured to executing the computer program instructions and perform:
  determining a service zone ID; and
  transmitting the service zone ID to a second network function entity including an AMF (access and mobility management function) entity or an SMF (session management function) entity, wherein the service zone ID is used for the second network function entity to select a service producer instance from a service producer, wherein the service zone ID includes a first service zone ID and a second service zone ID, and wherein transmitting the service zone ID comprises:
    transmitting, by the PCF entity of the first network function entity, in a registration process of a UE (user equipment), the first service zone ID to the AMF entity of the second network function entity;
    transmitting, in a PDU (protocol data unit) session establishment process of the UE, the second service zone ID to the second network function entity; and
    assigning to the first service zone ID a first use priority and assigning to the second service zone ID a second use priority higher than the first use priority, wherein the second network function entity, in response to receiving both the first service zone ID and the second service zone ID, uses the second service zone ID ahead of or instead of the first service zone ID.

12. The first network function entity according to claim 11, wherein the service zone ID is determined according to at least one of the following: an operator policy; application function (AF) requirements; local configuration data; and operation requirements of management and operations.

13. The first network function entity according to claim 11, wherein the second network function entity includes the AMF entity, the first network function entity includes the PCF entity, and the registration process includes an access management policy update process, and wherein the processor is further configured to perform:
 transmitting, by the PCF entity in the AM policy update process, the first service zone ID to the AMF entity.

14. The first network function entity according to claim 11, wherein the second network function entity includes the AMF entity, the first network function entity includes the UDM entity, and the registration process includes a subscription data obtaining process, and wherein the processor is further configured to perform:
 transmitting, by the UDM entity in the subscription data obtaining process, the first service zone ID to the AMF entity.

15. The first network function entity according to claim 11, wherein the second network function entity includes the SMF entity, the first network function entity includes the PCF entity, and the PDU session establishment process includes a session management (SM) policy association establishment or modification process, and wherein the processor is further configured to perform:
 transmitting, by the PCF entity in the SM policy association establishment or modification process, the second service zone ID to the SMF entity.

16. The first network function entity according to claim 11, wherein the processor is further configured to perform:
 transmitting, to the second network function entity, the service zone ID and at least one of the following: information of an applicable service type of the service zone ID; and an applicable time range of the service zone ID.

17. A non-transitory computer-readable storage medium storing computer program instructions executable by at least one processor of a first network function entity to perform a method, wherein the first network function includes a PCF (policy control function) entity or a UDM (unified data management) entity, and the method includes:
 determining a service zone ID; and
 transmitting the service zone ID to a second network function entity including an AMF (access and mobility management function) entity or an SMF (session management function) entity, wherein the service zone ID is used for the second network function entity to select a service producer instance from a service producer, wherein the service zone ID includes a first service zone ID and a second service zone ID, and wherein transmitting the service zone ID comprises:
  transmitting, by the PCF entity of the first network function entity, in a registration process of a UE (user equipment), the first service zone ID to the AMF entity of the second network function entity;
  transmitting, in a PDU (protocol data unit) session establishment process of the UE, the second service zone ID to the second network function entity; and
  assigning to the first service zone ID a first use priority and assigning to the second service zone ID a second use priority higher than the first use priority, wherein the second network function entity, in response to receiving both the first service zone ID and the second service zone ID, uses the second service zone ID ahead of or instead of the first service zone ID.

* * * * *